Oct. 30, 1962 D. J. HANVIN 3,060,979
MACHINE BENCH EMPLOYING A PORTABLE, MANUALLY-OPERABLE
ELECTRIC POWER TOOL
Filed April 19, 1961 2 Sheets-Sheet 1

INVENTOR:
Daniel Joseph Hanvin
BY
Richards & Geier
ATTORNEYS

Oct. 30, 1962 D. J. HANVIN 3,060,979
MACHINE BENCH EMPLOYING A PORTABLE, MANUALLY-OPERABLE
ELECTRIC POWER TOOL
Filed April 19, 1961 2 Sheets-Sheet 2
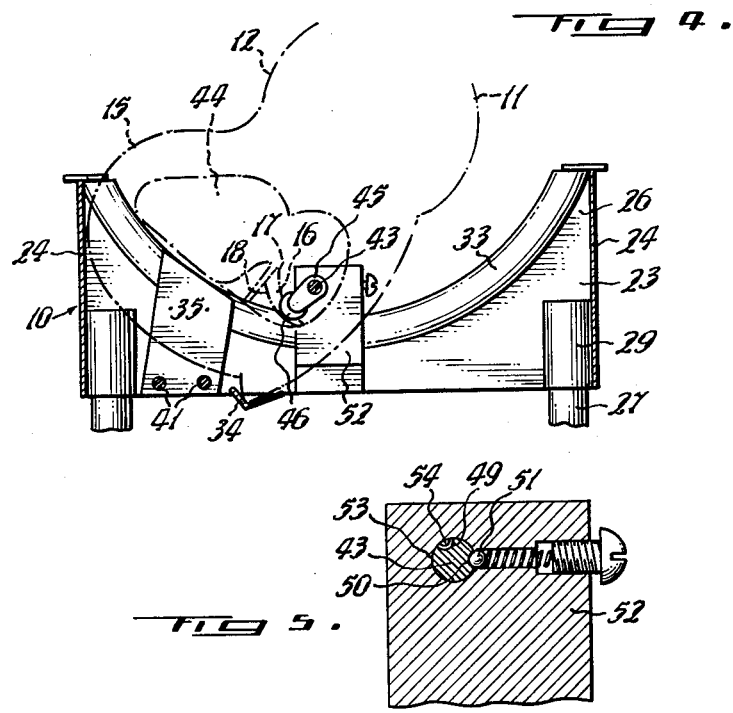
FIG 4.
FIG 5.
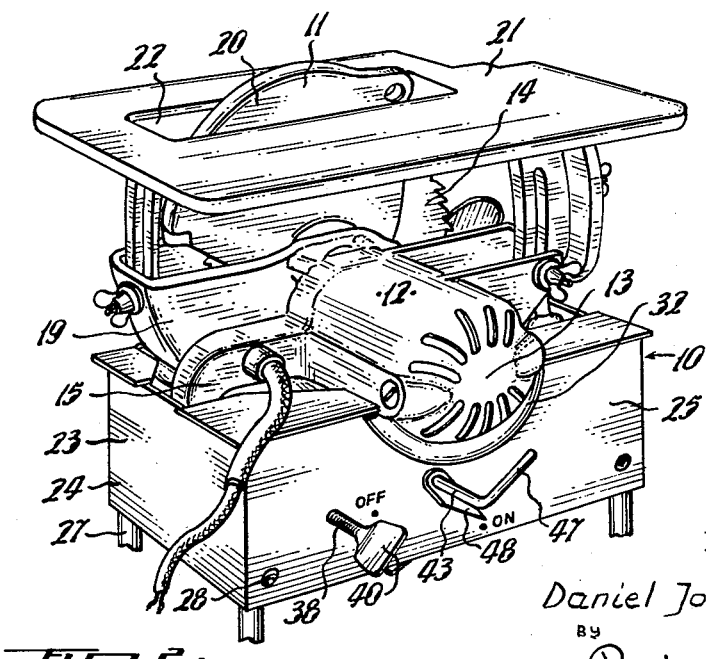
FIG 2.
INVENTOR:
Daniel Joseph Hanvin
BY
Richards & Geier
ATTORNEYS

United States Patent Office 3,060,979
Patented Oct. 30, 1962

3,060,979
MACHINE BENCH EMPLOYING A PORTABLE, MANUALLY-OPERABLE ELECTRIC POWER TOOL
Daniel J. Hanvin, Ballow St., Coolangatta, Queensland, Australia
Filed Apr. 19, 1961, Ser. No. 104,103
4 Claims. (Cl. 143—132)

This invention relates to a power tool mounting.

More particularly, the invention has reference to a mounting for converting a portable, manually-operable, electric power tool, such as an electric saw or grinder, to a bench-type tool.

The principal object of the invention is to provide a simple and inexpensive type of mounting whereby a portable electric power tool may be quickly and easily converted from a manually-controlled tool to a bench-type tool, and vice versa, its use for bench-mounting purposes affording positive mounting with safe and reliable operation at all times.

With the foregoing and other objects in view, my invention resides broadly in a mounting for a portable electric power tool of the type having a motor and shaft mounted in a housing, a trigger switch for the motor mounted on the housing, and a rotatable operating member, such as a circular saw blade or abrasive wheel secured to the shaft, said mounting including a frame adapted to support the housing and to be mounted on a floor or other surface, clamping means associated with the frame for releasably securing the housing relative to the frame, and an operating handle associated with the frame and adapted to be operated to actuate the trigger switch of the tool. Other features of the invention will become apparent from the following description.

In order that the invention may be more readily understood and put into practical effect, reference will now be made to the accompanying drawings, wherein:

FIG. 2 is a further perspective view of the power tool mounting showing the opposite side thereof to that shown in FIG. 1, the legs of the mounting being broken away;

FIG. 4 is a sectional view along the line 4—4 of FIG. 3, the position occupied by a mounted power saw being shown in broken outline, and FIG. 5 is a detail sectional view showing the engagement of the operating handle of the mounting in the handle-stabilising bracket thereof.

Figure 1:
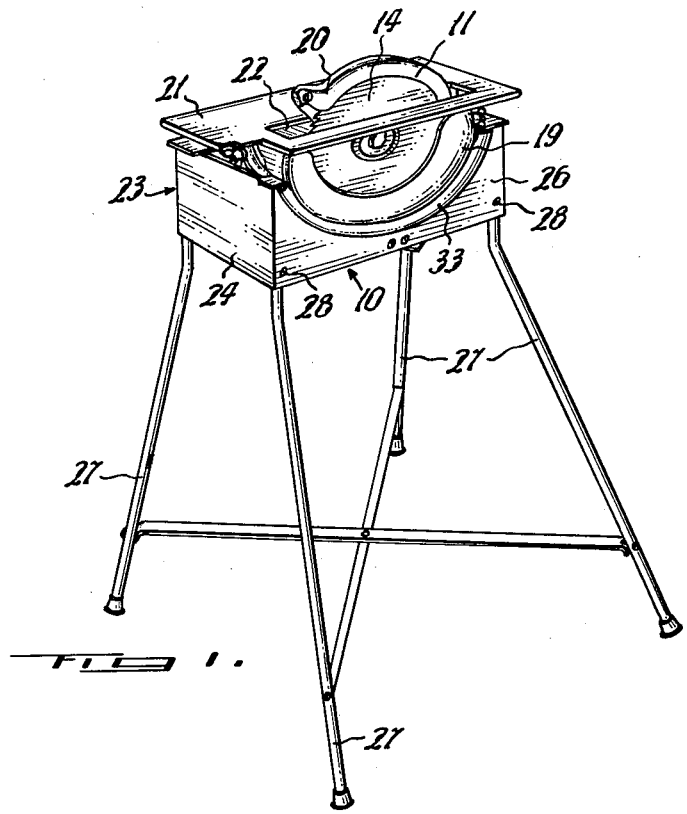
FIG. 1 is a perspective view of a power tool mounting according to my according to my invention, shown supporting a portable electric saw.
Figure 3:
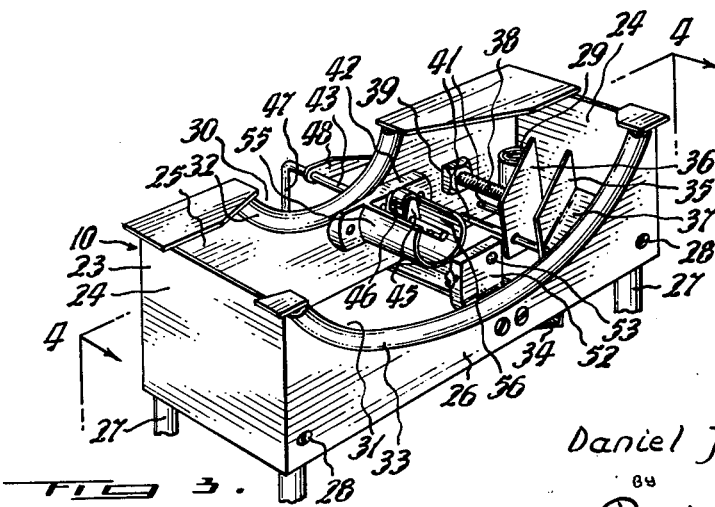
FIG. 3 (Sheet 1) is a perspective view of the box-like main frame of the power tool mounting.

There is shown in the drawings a mounting 10 for a portable electric power tool which in this instance is a conventional-type "Black & Decker" circular saw 11. The power tool 11 has a substantially cylindrical housing 12 which is closed at one end 13 and contains an electric motor (not shown), a motor shaft (also not shown) being rotatable axially in the housing 12 and having removably secured to its free end, remote from the closed end 13 of the housing, a circular saw blade 14. It will be understood that any other type of rotatable operating member, such as an abrasive wheel, may be substituted for the saw blade 14 for grinding or other purposes.

The power tool 11 has a hand grip and trigger guard 15 affixed to the motor housing 12 at right angles thereto and parallel to the cutting head or saw 14, the hand grip and trigger guard 15 enclosing a trigger switch 16 adapted to be depressed from an "off" position indicated by the broken line 17 in FIG. 4 to an "on" position shown by line 18, the construction of the trigger mechanism being quite standard, as indeed is the tool as a whole. A fixed semicircular guard 19 is secured to the housing 12 adjacent the hand grip 15 to enclose part of the cutting edge of the saw 14, while an arcuately-movable, spring-controlled guard 20 partly encloses the remainder of the saw and may be moved clear in the sawing operation by contact with the object to be sawn. The construction of the power tool 11 also includes a standard-type, universally-adjustable metal bench shoe 21 connected by adjustment members to the housing 12, the bench shoe also being adjustably movable towards and away from the housing 12 between the positions shown in FIGS. 1 and 2 so that the extent to which the blade 14 extends through the slot 22 of the shoe 21 may be varied to vary the depth of cut.

In normal manual use of the power saw 11, the hand grip 15 is uppermost and the shoe 21 may ride along the surface of the object to be sawn as the tool is operated manually. However, in mounting the tool in my apparatus, the tool is inverted, the hand grip 15 being directed downwards, while the bottom of the shoe 21 faces upwards and provides a bench-support for the article to be sawn. If desired, a larger bench plate not shown may be secured over the shoe 21 to increase the available bench area.

My power tool mounting 10 includes a box-like main frame 23 measuring in this instance some twelve inches long, six inches wide and five inches high, open at top and bottom and constituted by end plates 24, a rear side plate 25 at the "operating" side of the frame, and a front side plate 26 at the "cutting" side of the frame. The frame 23 is releasably mounted at its four corners on tubular legs 27 which have their upper ends secured by screws 28 in sleeves 29 welded within the corners of the frame 23. The legs 27 are splayed for stability, the two legs at the cutting end of the frame being not so sharply inclined as those at the other end so as not to impede the operator. The open upper end of the frame 23 allows the insertion therein of the power tool 11 with the motor housing 12 arranged transversely to and across the top of the frame, the saw blade 14 being parallel to and adjacent the front side plate 26 on the cutting side of the frame.

For the purpose of mounting the tool 11, the rear or operating-side plate 25 has a shallow arcuate recess 30, while the front or cutting-side plate 26 has a similar, coaxial but larger recess 31, the recesses having tubular plastic hose members 32 and 33 arranged around their inner peripheries so that the housing 12 may rest on the hose 32 and the larger diameter fixed saw guard 19 may rest on the hose 33. In its engaged position, the power saw 11 also has its hand grip and trigger guard 15 resting on a supporting bar 34 welded between the side plates 25 and 26. The tool 11 is brought to engaged position in a downward direction with the hand grip and trigger guard 15 passing between a pair of clamping plates 35 and 36 within the frame 23 and arranged parallel to the sides 25 and 26 thereof.

The clamping plate 35 is a fixed plate located on the front or cutting side of the medial longitudinal plane of the frame 23 and fixedly secured to a bracket 37 secured to the front side plate 26. The other clamping plate 36 is connected by a loose rotatable connection to the front end of a threaded clamping screw 38 which passes through a tapped member 39 on the rear side plate 25, the rear end of the clamping screw 38 in rear of the rear plate 25 having an operating head 40 whereby the screw 38 may be rotated to move the clamping plate 36 transversely of the frame to grip the hand grip 15 of the tool 11 between it and the fixed clamping plate 35. Rotation of the plate 36 is prevented by the provision of a pair of parallel transverse guide rods 41 passing loosely through apertures in the lower end of the movable clamping plate 36 and secured between the rear frame plate 25 and the fixed clamping plate 35. Thus, when the tool is mounted in the frame 23, quick and easy clamping therein may be effected by turning the head 40 to grip the hand grip 15 between the clamping plates 35 and 36, while easy removal may be effected by releasing the clamping device.

To operate the trigger switch 16 of the power tool 11, the rear side plate 25 has on its inner surface a supporting plate 42 about midway along its length and bored to allow close sliding passage of an operating handle rod 43 arranged transversely to the frame and therefore parallel to the aforementioned clamping screw 38. The rod 43 is so placed as to pass through the hand-opening 44 within the hand grip 15 of the tool, so that the rod 43 would be initially withdrawn in a rearward direction until the tool 11 has been inserted in the frame 23, whereafter the rod 43 is moved slidably forwards to enter and pass through the hand opening 44 adjacent the trigger switch 16 as will be apparent from FIG. 4.

At a short distance from the inner end of the rod 43 there is secured a lever-type bracket 45 having a rubber, plastic or other roller 46 arranged for rotation about an axis parallel to the rod 43, while the other or rear end of the rod has a control lever 47 to enable the rod 43 to be moved manually in its sliding action or rotated to turn the bracket 45 downwards so that the roller 46 engages and depresses the trigger switch 16 to operate the tool. An indicating arm 48 on the rod 43 is adapted to coact with markings (as shown in FIG. 2) to show inoperative and operative angular dispositions of the rod 43.

The inner of front extremity of the operating handle rod 43 has two radial depressions 49 and 50 (shown in FIG. 5) spaced circumferentially, either one being adapted to accommodate in part a ball-bearing 51 in a handle-stabilising bracket 52 secured to the front side plate 26. This bracket 52 is mounted in line with the rod 43 and has an aperture 53 to accommodate the front extremity of same, the ball-bearing 51 being spring-urged into the aperture 53 and against the rod 43. The one depression 49 is joined to a longitudinal slot 54 extending to the front extremity of the rod so that the latter may be passed into the aperture 53 with the spring-loaded ball 51 easily riding along the slot 54 and into the depression 49 to prevent easy withdrawal of the rod. This is the engaged but non-actuating position of the rod 43, the roller 46 then being above the rod and clear of the trigger switch 16. Upon rotating the rod to the actuating position, the ball 51 will be depressed against its spring and then take up position in the other depression 50 which has no slot similar to the slot 54 so that the rod 43 will not be able to be withdrawn except by exerting considerable force.

A guide sleeve 55 of the supporting plate 42 surrounds the rod 43 on the rear side of the engaged tool and has an upper slot 56 through which the bracket 45 and roller 46 may protrude when the rod 43 is withdrawn and disposed in the inoperative angular disposition, and it will be apparent that this sleeve 55 will prevent withdrawal of the rod 43 when the bracket 45 is disposed other than in the inoperative position. Thus, the trigger switch 16 must be released before the rod 43 may be withdrawn to allow the power tool to be removed from the mounting.

The operation and use of the mounting will be apparent from the foregoing description and the drawings, and it will be seen that the invention provides a very firm, positive and quick clamping action, while the operating mechanism for the trigger has been designed to ensure safety and reliability while guarding against the possibility of accidental actuation. The mounting will be firm and convenient, whether used with or without the supporting legs, and it will have the advantage that the mounted power tool may still be easily transferred from one location to another, the open lower end of the frame affording a convenient hand grip for this purpose. At the same time, the overall assembly of tool and mounting will be very compact and will not interfere with any of the normal operations of the tool or the adjustments of the bench shoe.

While mountings as described will therefore be found very effective in achieving the aforementioned objects, many modifications of constructional detail and design may be made without departing from the scope and ambit of the invention as defined by the appended claims.

What I claim is:

1. A mounting for a portable electric power tool of the type having a motor and shaft mounted in a housing, a hand grip secured to the housing and enclosing a trigger switch adapted to be depressed to cause operation of the motor, and a rotatable operating member, such as a circular saw blade or abrasive wheel secured to the shaft, said mounting including a frame adapted to support the housing and to be mounted on a floor or other surface, clamping means associated with the frame for releasably securing the housing relative to the frame, and a withdrawable operating handle associated with the frame and adapted to be arranged either in a withdrawn position to enable the housing to be engaged with and supported by the frame with the handle clear of the trigger switch, or an engaged position adjacent the trigger switch after the housing has been mounted on the frame, the handle being further adapted, when in engaged position, to be operated to depress the trigger switch enclosed within the tool handle.

2. A power tool mounting according to claim 1, wherein the operating handle consists of a rod mounted slidably for movement between the withdrawn and engaged positions, the rod having a contact lever member adapted to be disposed against the trigger switch within the tool handle when the rod is in engaged position, the rod further being rotatable in engaged position to move the lever member to depress and actuate the trigger switch, means being provided to prevent rotation of the rod except when in engaged position.

3. A power tool mounting according to claim 1, wherein the clamping means comprise a pair of clamping plates adapted to receive therebetween the hand grip of the power tool, screw-threaded means being provided to move at least one of the clamping plates towards the other to engage the hand grip of the power tool between the clamping plates.

4. A power tool mounting according to claim 1, wherein the frame is of open-topped, box-like form having front and rear parallel vertical side plates, one side plate being recessed at its top to accommodate the housing, while the other side plate is recessed to accommodate a saw guard secured to the housing and surrounding an edge of the operating member, the hand grip and trigger switch of the power tool being accommodated in the frame between the vertical side plates thereof.

References Cited in the file of this patent

UNITED STATES PATENTS 2,759,507  Davis et al. _____ Aug. 21, 1956
2,933,113  Meyer _____ Apr. 19, 1960